United States Patent
Jansson

(10) Patent No.: US 12,551,903 B2
(45) Date of Patent: Feb. 17, 2026

(54) METHOD AND ARRANGEMENT FOR PROCESS WATER TREATMENT

(71) Applicant: Metso Finland Oy, Espoo (FI)

(72) Inventor: Kaj Jansson, Tampere (FI)

(73) Assignee: Metso Finland Oy, Espoo (FI)

( * ) Notice: Subject to any disclaimer, the term of this patent is extended or adjusted under 35 U.S.C. 154(b) by 723 days.

(21) Appl. No.: 17/288,975

(22) PCT Filed: Oct. 29, 2018

(86) PCT No.: PCT/FI2018/050787
§ 371 (c)(1),
(2) Date: Apr. 27, 2021

(87) PCT Pub. No.: WO2020/089506
PCT Pub. Date: May 7, 2020

(65) Prior Publication Data
US 2021/0379605 A1 Dec. 9, 2021

(51) Int. Cl.
*B03D 1/02* (2006.01)
*B03D 1/14* (2006.01)
(Continued)

(52) U.S. Cl.
CPC .......... *B03D 1/028* (2013.01); *B03D 1/1431* (2013.01); *C02F 9/00* (2013.01);
(Continued)

(58) Field of Classification Search
None
See application file for complete search history.

(56) References Cited

U.S. PATENT DOCUMENTS

| | | | | |
|---|---|---|---|---|
| 2,387,081 | A * | 10/1945 | Herkenhoff | B03D 1/02 423/340 |
| 2005/0115908 | A1* | 6/2005 | Umezawa | C02F 1/004 210/717 |

(Continued)

FOREIGN PATENT DOCUMENTS

| | | |
|---|---|---|
| CN | 105080730 A | 11/2015 |
| WO | 2018050950 A1 | 3/2018 |
| WO | 2020025851 A1 | 2/2020 |

OTHER PUBLICATIONS

International Search Report and Written Opinion for corresponding International Application No. PCT/FI2018/050787 mailed Mar. 5, 2019.
(Continued)

*Primary Examiner* — Peter Keyworth
(74) *Attorney, Agent, or Firm* — Andrus Intellectual Property Law, LLP

(57) ABSTRACT

A method for treating process water of a flotation arrangement is disclosed. The process comprising the steps of a) dewatering overflow of a mineral flotation circuit in a gravitational solid-liquid separator to separate a sediment from a supernatant comprising water, silica-containing particles and soluble SiO2, fine particles, microbes, and residual flotation chemicals; b) subjecting the supernatant to cleaning flotation, in which at least 90% of the flotation gas bubbles have a size from 0.2 to 250 μm, in a cleaning flotation unit for collecting at least silica-containing particles, for separating at least silica-containing particles from the supernatant into cleaning flotation overflow, and for forming purified process water as cleaning flotation underflow; c) removing cleaning flotation overflow as tailings; and d) recirculating purified process water into the mineral flotation circuit. A process water treatment arrangement is also disclosed.

17 Claims, 3 Drawing Sheets

(51) Int. Cl.
  *C02F 9/00* (2023.01)
  *C02F 1/00* (2023.01)
  *C02F 1/24* (2023.01)
  *C02F 1/52* (2023.01)
  *C02F 101/10* (2006.01)
  *C02F 103/10* (2006.01)

(52) U.S. Cl.
  CPC .... *B03D 2203/008* (2013.01); *B03D 2203/04* (2013.01); *C02F 1/001* (2013.01); *C02F 2001/007* (2013.01); *C02F 1/24* (2013.01); *C02F 1/5245* (2013.01); *C02F 1/5263* (2013.01); *C02F 2101/10* (2013.01); *C02F 2103/10* (2013.01); *C02F 2303/04* (2013.01)

(56) References Cited

U.S. PATENT DOCUMENTS

| | | | | |
|---|---|---|---|---|
| 2007/0102359 | A1* | 5/2007 | Lombardi | B01D 61/146 210/764 |
| 2011/0192801 | A1* | 8/2011 | Jeanmarie | C02F 1/24 210/704 |
| 2017/0120258 | A1 | 5/2017 | Rodriguez et al. | |
| 2017/0260065 | A1* | 9/2017 | Blondeau | C02F 11/127 |
| 2021/0308695 | A1 | 10/2021 | Bourke et al. | |

OTHER PUBLICATIONS

Azevedo, A. et al. Minerals Engineering, 2018. vol. 127, No. 114-121. Available online Aug. 4, 2018. Treatment and water reuse of lead-zinc sulphide ore mill wastewaters by high rate dissolved air flotation.

Lima N.P. et al. Minerals Engineering, 2016. vol. 96-97, p. 53-58. The entrainment effect on the performance of iron ore reverse flotation.

Batisteli G. M. B. et al. Minerals Engineering, 2008. vol. 21, p. 873-876. Residual amine in iron ore flotation.

Office Action for Chinese Patent Application No. 201880100473.5, dated Apr. 13, 2023.

Yu-chi Shi et al, "Experimental study on treatment and reuse of wastewater from poly-metallic mine in Hunan", China Tungsten, vol. 30, No. 5, pp. 34-38.

J. Rubio et al, "Overview of flotation as a wastewater treatment technique", Foreign Minerals Engineering, pp. 4-13.

Search Report for Eurasian Patent Application No. 202191011, mailed Feb. 7, 2022.

Amanbaev et al., "Simulation of the Ascent of an Air Bubble in a Liquid Taking Into Account the Mineralization of I, ts Surface", retrieved from http://www.rusnauka.com/13_NPE_2016/Matemathics/4_211495.doc.htm on Mar. 27, 2022.

Extended European Search Report for corresponding European Application No. 18938839, dated May 17, 2022.

Office Action for corresponding Chilean Patent Application No. 202101095 dated May 30, 2022.

Haselhuhn et al. "Water chemistry analysis of an industrial selective flocculation dispersion hematite ore concentroter plant". International Journal of Mining Processing. Oct. 8, 2011. pp. 99-106. vol. 102.

Richter et al. "Flotation of Metallic Ores—an Overview, Part 2". AT Mineral Processing. Jul. 1, 2015. pp. 63-75. vol. 56, No. 7/8.

Office Action for Mexican Patent Application No. MX/a/2021/005031, dated Jul. 23, 2025.

Office Action for Ukrainian Patent Application No. 2021 02511, dated Jan. 17, 2025.

* cited by examiner

METHOD AND ARRANGEMENT FOR PROCESS WATER TREATMENT

CROSS-REFERENCE TO RELATED APPLICATIONS

This application is the U.S. national stage application of International Application PCT/FI2018/050787, filed Oct. 29, 2018, which international application was published on May 7, 2020, as International Publication WO 2020/089506 A1 in the English language.

TECHNICAL FIELD

The current disclosure relates to a method and an arrangement for treating process water of a flotation arrangement. In particular, the invention is intended for treating process waters of a flotation arrangement for Fe reverse flotation.

BACKGROUND

The types of iron ore deposits is variable, like numerous other ore types. However, the major iron ore resources are composed of metamorphosed iron formations called banded iron formations (BIF). Banded iron formations form extensive iron ore basins. BIF areas are also associated with weathering crusts, also called bedded iron deposits (BID) formed by natural processes. These BIDs contain iron-rich hematite, goethite and siderite magnetite, and microplaty hematite ores.

In general, magnetic separation is the most commonly used beneficiation process for iron ores because the dominant iron minerals are ferromagnetic and paramagnetic. However, iron ores should be processed according to its mineral composition, physical properties, character and degree of liberation of the iron-bearing minerals from the gangue. The gangue minerals in BIF typically include quartz, several iron-bearing silicates as amphiboles, micas and pyroxenes, carbonates, feldspars, and clays.

The industrial production of iron ore pellets and other high-quality metallurgical raw materials requires pellets with limited contents of silica, aluminium oxide and other impurities. These requirements have led to the increased use of flotation instead of gravity and magnetic separation to reduce the content of harmful impurities and produce iron "super concentrates".

The beneficiation by flotation of low-grade oxidized iron ores is called reverse flotation, where the gangue is separated by flotation from the valuable finely grained iron ores. The valuable ore is collected from the underfloor of the flotation unit. The most common flotation route used for the beneficiation of these low grade iron ores is reverse cationic flotation. The advantages of reverse cationic flotation over anionic flotation include a higher process selectivity and rates, as well as satisfactory results when hard water is used.

To enable the removal of silicates during reverse cationic flotation, a collector based on a mixture of primary ether amine and non-ionic surfactant, such as fatty iso-alcohols, is recommended.

Typically, the gangue froth removed in the reverse flotation is sent to a tailings dam where the long resident time, typically 20-40 days, is expected to sediment and separate the solids, as well as decompose residual flotation chemicals from the collected and reusable process water. The collected process water is then recirculated back into the beneficiation process. The quality of the recirculated process water plays a significant role in obtaining target recoveries and qualities of the final product.

Today, water shortage, ecological demands placed by legislation and public pressure, costs and extensive space requirements of the aforementioned conventional tailings methods for process water treatment increasingly put pressure to recirculate process waters as main processes in flotation become at least partially closed-loop systems in terms of water usage. Alternative methods for treatment of tailings flows that enables least partially closed-loop water systems may be needed.

A conventional tailings treatment method with typical resident time of 20-40 days may result in acceptable water quality, allowing the treated process water to be reused in the main flotation process, and in other process steps. Changing over to other tailings methods such as thickened tailings, paste, dry stacking or hybrids of these, will result in much shorter sedimentation time due to the new thickeners needed in these process steps. This leads to much shorter sedimentation time, 3-8 h, that result in more fines, residual chemicals and other harmful or detrimental substances ending up in the thickener overflow, and later in recycled process water. These impurities in the overflow may affect negatively the main flotation process and final product quality if not properly handled prior to recycling the process water back into the main process.

In reverse flotation of Fe, typically hydrophobic amino-based flotation chemicals (collectors) are used to attach to the gangue particles and increase their hydrophobicity so that they can be removed as overflow in the reverse flotations step. However, when these hydrophobic particles are send to the tailings thickener, they tend to float (as designed) or follow water flow more easily instead of sedimenting as desired. Similarly, residual and non-reacted collector chemicals may end up in the thickener overflow as the short residence time is not enough for the chemicals to decompose, as would happen in a conventional tailings dam over time. Also, other light materials with low density like organic material, bacteria and other microbes, colloidal and soluble material will follow the water flow to the thickener overflow, resulting in worsening overflow quality.

This kind of process water may comprise a significant amount of silicates which, when water is recirculated back into the flotation process, use up flotation chemicals and disrupt floating of silicates from the freshly introduced slurry infeed. Silicates may end up in the recovered Fe material in the underflow, which deteriorates both yield and quality of the Fe material.

Conventional solution to control the accumulation of collector chemicals and suppress microbiological growth is to send the flotation froth to the tailings dam with a long retention time. Another method is to use a chemical oxidant, e.g. NaOCl, which can be added before a thickener to decompose collector chemicals and improve sedimentation of very fine material. However, a drawback of using such chemicals are higher Cl levels than can lead to equipment corrosion and failure. They are also hazardous to environment and personnel due to formation of $Cl_2$, if used in acidic conditions. It will also affect the entire flotation operation, making chemical dosage and process control more difficult.

SUMMARY OF THE INVENTION

A method for treating process water of a flotation arrangement is disclosed. The flotation arrangement comprises a mineral flotation circuit arranged to treat ore particles comprising Fe suspended in slurry by reverse flotation for the separation of slurry into underflow and overflow, and a process water treatment arrangement for treating overflow of the flotation circuit. The method comprises the steps of a) dewatering overflow of the flotation circuit in a gravitational solid-liquid separator to separate a sediment from a supernatant comprising water, silica-containing particles and soluble $SiO_2$, fine particles, microbes, and residual flotation chemicals; b) subjecting the supernatant to cleaning flotation in which at least 90% of the flotation gas bubbles display a size from 0.2 to 250 µm, in a cleaning flotation unit for collecting at least silica-containing particles, for separating at least silica-containing particles from the supernatant into cleaning flotation overflow, and for forming purified process water as cleaning flotation underflow; c) removing cleaning flotation overflow as tailings; and d) recirculating purified process water into the mineral flotation circuit.

In another aspect of the invention, a process water treatment arrangement for treating overflow of a mineral flotation circuit is disclosed. The flotation circuit is arranged to treat ore particles comprising Fe suspended in slurry by reverse flotation. The process water treatment arrangement comprises a gravitational solid-liquid separator for dewatering overflow to separate a sediment from a supernatant comprising water, silica-containing particles and soluble $SiO_2$, fine particles, microbes and residual flotation chemicals; and a cleaning flotation unit employing flotation gas bubbles of which at least 90% display a size from 0.2 to 250 µm, operationally connected to the gravitational solid-liquid separator for receiving the supernatant, and arranged to collect at least silica-containing particles, to separate at least the silica-containing particles from the supernatant into cleaning flotation overflow, and to form purified process water as cleaning flotation underflow configured to be led back into the mineral flotation circuit.

With the invention the aforementioned problems in water recirculation and downsides associated with conventional solutions may be alleviated. Overflow or supernatant from the gravitational solid-liquid separator is subjected to cleaning flotation in a cleaning flotation unit so that silicate compounds (both colloidal and soluble) may be 1) flocculated into bigger particles—normally the collector chemicals carried over from the main reverse flotation process are enough to flocculate the silicates, 2) separated from the thus purified process water by DAF, and 3) collected away as tailings to be further treated elsewhere. The resulting purified process water can then be recirculated back into the main flotation process. As the purified process water comprises significantly less silicates, it will not affect the main reverse flotation process detrimentally.

As the overflow from the mineral or main flotation process resides relatively short time in the gravitational solid-liquid separator, the flotation chemicals, collectors carried over in overflow from the main flotation process do not decompose, as would happen in a conventional tailings dam over time. These collector chemicals may then be utilized in the cleaning flotation step as collectors, thereby making the floating and collection of desired material possible, i.e. collection of silicate material, thus resulting in purified process water. At the same time, these residual flotation chemicals become used up, and they do not carry over back into the main mineral flotation process when the purified process water is recirculated back. Thus, the main flotation process is unaffected by such undesired flotation chemicals, making the controlling of the mineral flotation process easier.

In the cleaning flotation process, other colloidal material such as C, P, N present in very fine particles may also be removed, as well as any starch-based depressants present in the process water, thereby removing nutrients that would promote microbiological growth in the purified process water. This may improve the result of any subsequent water treatment stages such as filtering. For example, the removal of such material may prevent blocking of filter orifices of ceramic filters.

As the slurry or gravitational solid-liquid separator overflow comprises only fine particles (larger particles end up in sediment), the cleaning flotation may be energy-efficiently utilized at a stage where it is most efficient, i.e. for removing fine particles.

In an embodiment of the invention, the cleaning flotation unit is a dissolved gas flotation (DAF) unit.

In an embodiment, prior to step b), the temperature of the supernatant is 2 to 70° C.

In an embodiment, prior to step b) pH of the supernatant is 5 to 14.

The temperature and/or the pH of the supernatant may be inherent, i.e. caused by the preceding process steps or environment, or, when desired, the properties may be adjusted as needed, for example to optimize the cleaning flotation in step b).

In an embodiment, in step a), the residence time of overflow in the gravitational solid-liquid separator in under 10 hours, preferably 2 to 8 hours.

In an embodiment, the solids content of the sediment of the gravitational solid-liquid separator is at least 80 w-%.

A relatively short residence time means that the flotation chemicals, in particular the collector chemicals are not decomposed but are carried over with the supernatant, and they may be utilized in the subsequent cleaning flotation step. By effecting a high enough solids content into the sediment, the amount of solid tailings to be treated may be decreased.

In an embodiment, after step a), the supernatant is led into a separator overflow tank.

A separator overflow tank may be used to control the flow of supernatant into the cleaning flotation unit, or into a mixing unit, if such is used. This may help in stabilizing the overall process water treatment operation, as the flow supernatant into the subsequent operational steps is controlled.

In an embodiment, that prior to step b), the supernatant is chemically conditioned in a mixing unit by adding a coagulant and/or a flocculant to flocculate silica-containing particles in the supernatant.

In a further embodiment, the coagulator is chosen from a group comprising: inorganic collectors, aluminium salts, iron salts, organic coagulants.

In a further embodiment, a coagulant is added into the supernatant in an amount of 20 to 2000 ppm.

In an embodiment, the flocculant is chosen from a group comprising: natural polymers, synthetic flocculants.

In a further embodiment, a flocculant is added into the supernatant in an amount of 1 to 100 ppm.

While normally there are enough flotation chemicals (collector chemicals) present as carry-over from the main flotation process in the supernatant, in some cases, it may be necessary to condition the supernatant before the DAF treatment, to ensure that enough of the silicates may be removed by the DAF unit. This may be done in a conventional mixing unit configured to allow addition of different chemicals, such as flocculants and/or coagulants, and treatment of fluid with those chemicals. The amount of coagulant and/or flocculant is chosen based on the process, and is highly directed by cost of the chemicals. Organic coagulants are more expensive than inorganic ones. Typically, flocculants are added in amounts under 10 ppm.

In an embodiment, in step b), at least 90% of the $SiO_2$ of overflow from the flotation circuit is removed.

In an embodiment, in step b), at least 70% of the soluble $SiO_2$ of overflow from the flotation circuit is removed.

The aim of the method is to remove as much of the silicates of the Fe reverse flotation overflow as possible. Silicates remaining in the purified process water are detrimental to the main flotation process, and silicates ending up in recovered Fe material decrease the quality and value of the end product (iron material). Both instances also decrease efficiency of flotation process. Removal of excess silicates decreases the flotation chemical consumption, and fresh water consumption.

In an embodiment, prior to step d), the purified process water is subjected to filtration for removing chemicals promoting microbiological growth.

In a further embodiment, in filtration, a filtering unit comprising a ceramic filter is used.

By filtering the purified process water, other harmful components may be removed, thus promoting to cleanliness of the water to be recirculated back into the main flotation process. For example, sliming of equipment may be decreased.

By using the cleaning flotation unit for treating the supernatant, a major part of the chemical residues in particle form may be removed from the purified process water. This allows the utilization of ceramic filter plates—in ceramic filter plates, the filter pores may be susceptible to blocking by particles of a certain size range. By removing those particles at least partially, blockages may be avoided and the operation of the filtering unit improved.

In an embodiment, hardness of the purified process water is unaffected by the process water treatment arrangement.

Maintaining water hardness at a goal level allows the controlling of the main flotation process as desired. Flotation chemical addition can be kept at a constant level as water hardness is constant, and hydrophobic particles improves the mineral flotation when hardness is at a certain level. Conventional water treatment methods, such as nanofiltration membranes or reverse osmosis membranes may effect water hardness as compounds (Ca, K, Mn, Mg) become removed together with the detrimental substances. A cleaning flotation unit allows these compounds remain in water, as they are not collected into the cleaning flotation overflow and removed into tailings.

In an embodiment of the process water treatment arrangement according to the invention, the cleaning flotation unit is a DAF unit.

In an embodiment, the process water treatment arrangement further comprises a mixing unit after the gravitational solid-liquid separator, the mixing unit configured to chemically condition the supernatant to flocculate silica-containing particles in the supernatant.

In an embodiment, the process water treatment arrangement further comprises a separator overflow tank after the gravitational solid-liquid separator.

In an embodiment, the process water treatment arrangement further comprises a filtering unit for removing chemicals promoting microbiological growth from the purified process water after the DAF unit.

In a further embodiment, the filtering unit comprises a ceramic filter.

BRIEF DESCRIPTION OF THE DRAWINGS

The accompanying drawings, which are included to provide a further understanding of the current disclosure and which constitute a part of this specification, illustrate embodiments of the disclosure and together with the description help to explain the principles of the current disclosure. In the drawings.

DETAILED DESCRIPTION

Reference will now be made in detail to the embodiments of the present disclosure, an example of which is illustrated in the accompanying drawings.

The description below discloses some embodiments in such a detail that a person skilled in the art is able to utilize the flotation arrangement and its use, and the method based on the disclosure. Not all steps of the embodiments are discussed in detail, as many of the steps will be obvious for the person skilled in the art based on this disclosure.

For reasons of simplicity, item numbers will be maintained in the following exemplary embodiments in the case of repeating components.

Figure 1:
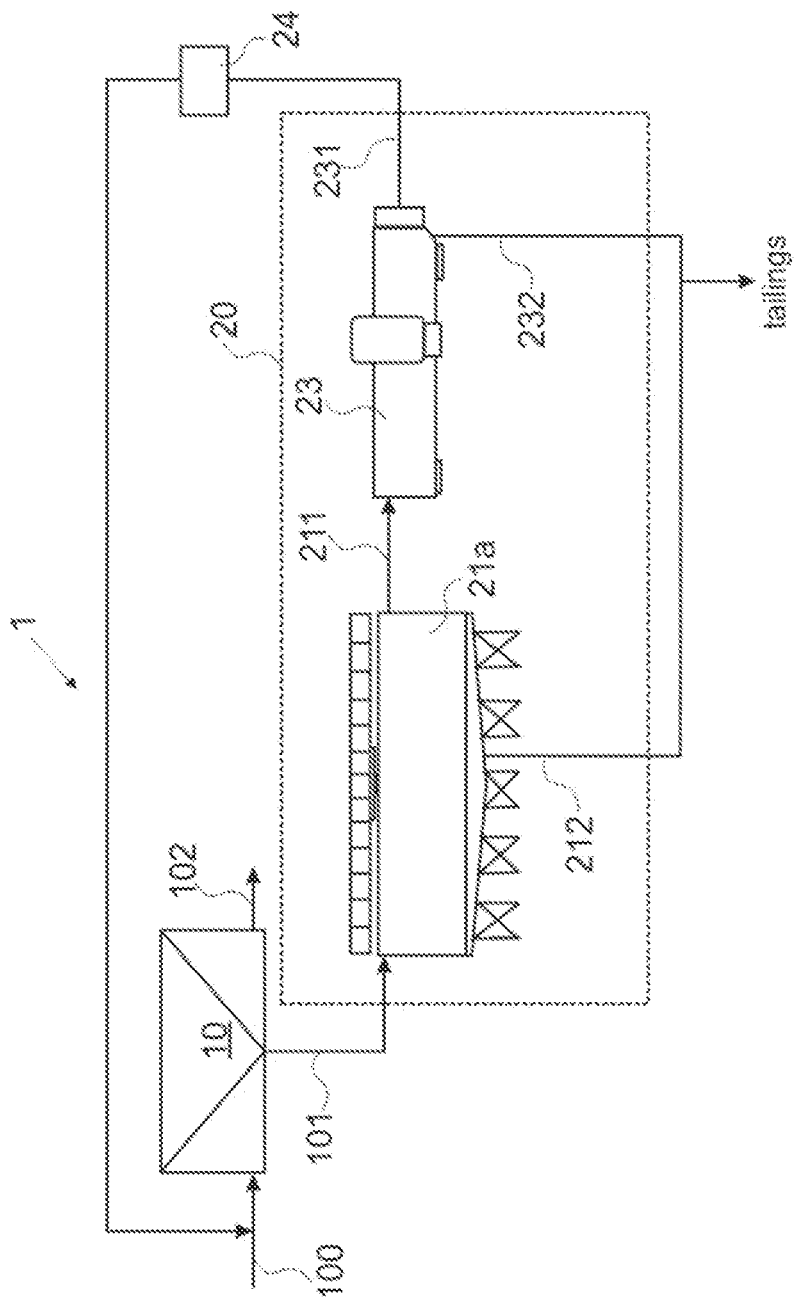
FIGS. 1-3 are simplified flow charts of embodiment of the invention.
Figure 2:
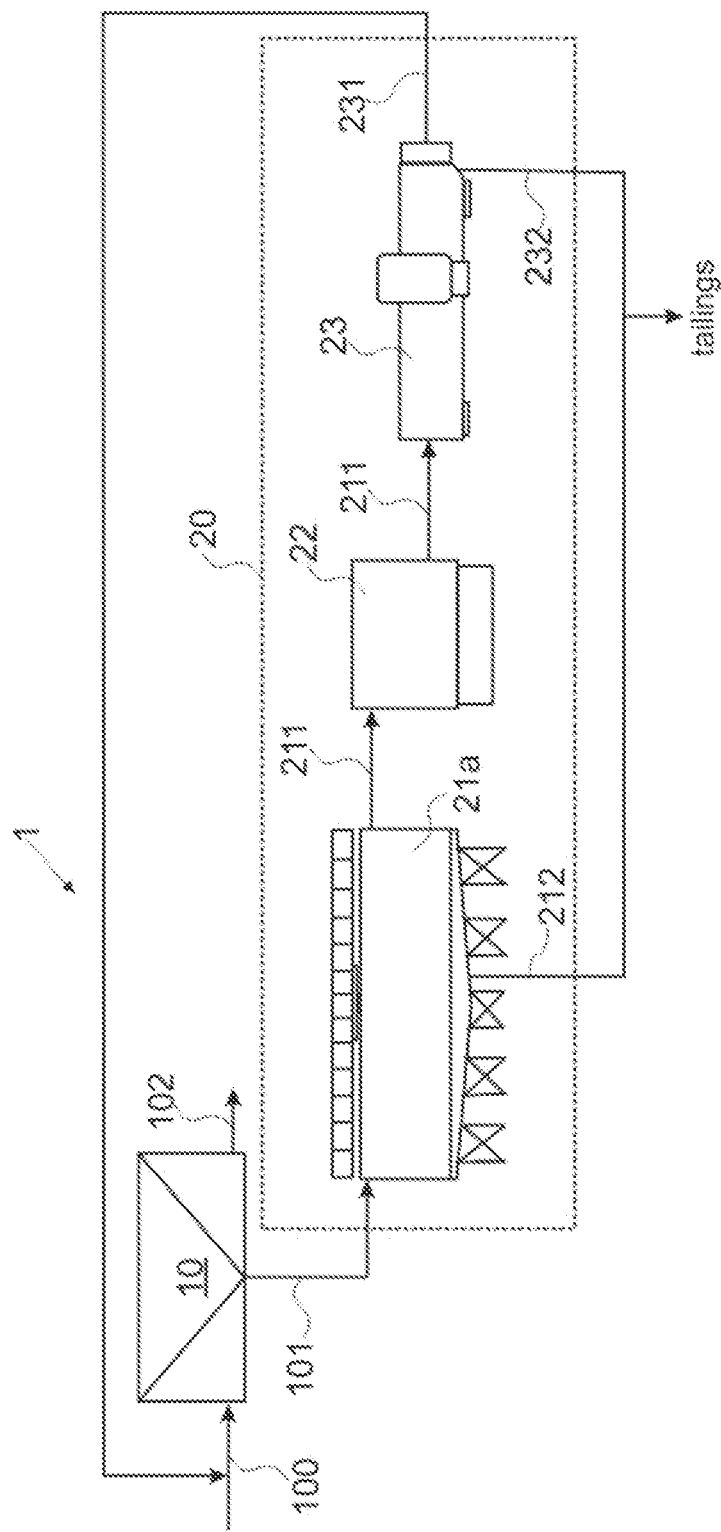
Figure 3:
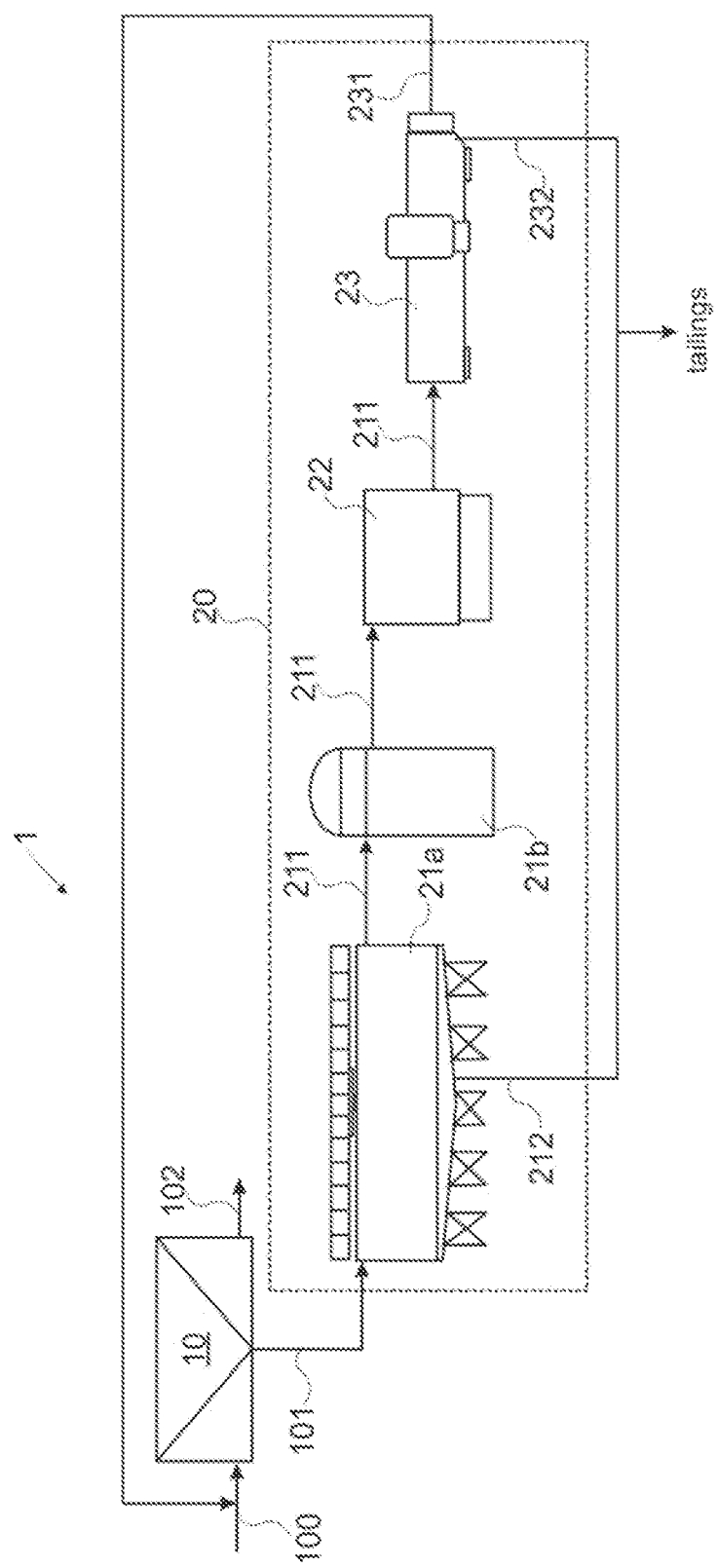

The enclosed FIGS. 1-3 illustrate a flotation arrangement 1 in some detail. The figures are not drawn to proportion, and many of the components of are omitted for clarity. The flotation arrangement 1 comprises a mineral flotation circuit 10 arranged to treat ore particles comprising Fe, suspended in slurry 100, by reverse flotation so that the slurry is separated into overflow 101 and underfloor 102. Overflow 101 may comprise silicate-containing particles, soluble $SiO_2$ and other undesired, detrimental or unrecovered material or compounds such as fine particles and larger particles comprising C, P, N, Ca, K, Mn, Mg; residual flotation chemicals such as amino-based collector chemicals or starch-based depressants, microbes etc, suspended and/or dissolved in water. Underflow 102 comprises the recovered Fe-containing material.

The flotation arrangement 1 further comprises a process water treatment arrangement 20, intended for treating overflow 101 of the mineral flotation circuit 10. The process water treatment arrangement 20 comprises a gravitational solid-liquid separator 21 in which overflow 101 is dewatered in a conventional manner, i.e. by separating a sediment 212 comprising larger, heavier particles from a supernatant 211 comprising the aforementioned solid compounds in a fine particle range (at least silica-containing particles), as well as any residual flotation chemicals, soluble $SiO_2$, microbes and water. The gravitational solid-liquid separator 21 may, for example, be a thickener or a clarifier.

The process water treatment arrangement 20 further comprises a cleaning flotation unit 23. The cleaning flotation unit employs flotation gas to float particles collected by collector chemicals. In particular, flotation in the cleaning flotation unit 23 is executed by utilizing microbubbles, or flotation gas bubbles having a particular size range. In the cleaning flotation and cleaning flotation unit 23 according to the invention, at least 90% of the flotation gas bubbles fall into a size range of 2 to 250 µm. The cleaning flotation may employ dissolved gas flotation (DAF), and the cleaning flotation unit 23 may be a DAF unit. Other methods for effecting flotation with smaller sized flotation gas bubbles may also be employed, such as electrical double layer flotation or membrane flotation.

DAF is a microflotation process which is used in various applications in water or effluent clarification. Solid particles are separated from liquid by using very small flotation gas bubbles, microbubbles. The microbubbles with a size range of 30-100 µm are generated by dissolving air or other flotation gas into the liquid under pressure. The bubbles are formed in a pressure drop when dispersion is released. The particles of solid form attach to the bubbles and rise to the surface. A formed, floating sludge is removed from the liquid surface with sludge rollers as DAF overflow. Chemicals may sometimes be needed to aid flocculation and increase solids removal efficiency. Typically, colloids removal is possible with efficient coagulation.

In the cleaning flotation unit 23, the supernatant 211 is subjected to flotation in order to collect at least the silica-containing particles, additionally also other particles such as particles comprising C, P, N. In an embodiment of the invention, the supernatant 211 comprises an amount of residual flotation chemicals (for example amino-based collectors) as carry-over from the Fe reverse flotation process in the mineral flotation circuit 10 sufficient to flocculate a significant part of the silica-containing particles, as well as to coagulate the soluble $SiO_2$ into solid form particles. Subsequently, at least silica-containing particles are separated from the supernatant into cleaning flotation overflow 232 and removed from the flotation arrangement 1 as tailings. Concurrently, purified process water 231 is formed in the cleaning flotation unit 23 as cleaning flotation underfloor. The purified process water 231 may then be recirculated back into the mineral flotation circuit 10 to be used for example as dilution water for slurry 100 infeed.

The purified process water 231 may be further treated in a filtering unit 24 to remove microbes and chemicals promoting microbiological growth, or to remove any other undesired chemicals from the purified process water 231 (see FIG. 1). The filtering unit 24 may be of any type known in the field. In an embodiment, the filtering unit 24 comprises a ceramic filter or a number of ceramic filters.

Further, the process water treatment arrangement 20 may comprise a separator overflow tank 21b directly after the gravitational solid-liquid separator 21 (see FIG. 3). The supernatant 211 is led into the separator overflow tank 21b prior to directing it into the cleaning flotation unit 23, for example to control the volumetric flow into the cleaning flotation unit 23. Further, additionally or alternatively, the process water treatment arrangement 20 may comprise a mixing unit 22 (see FIGS. 2, 3) after the gravitational solid-liquid separator, or after the separator overflow tank 21b, if one is employed. The mixing unit 22 may be of any type known in the field, arranged to enable the addition of desired chemicals such as coagulants and/or flocculants and the treatment of the supernatant 211 by chemical conditioning so that at least the silica-containing particles may be flocculated prior to leading the supernatant 211 into the DAF unit 23. Also the soluble $SiO_2$ may be thus flocculated into solid form particles and thus subsequently removed from the purified process water. This may be required, should the supernatant not comprise a sufficient amount of residual collector chemicals as carry-over from the flotation circuit 10 to ensure sufficient flocculation of silica-containing particles in the cleaning flotation unit 23, or ensure the creation of sufficiently large flocs in the cleaning flotation unit 23. Both the separator overflow tank 21b and the mixing unit 22 may be further utilized to adjust the temperature and/or pH of the supernatant 211, if desired, to prepare the supernatant for the cleaning flotation.

In the method for treating process water of the flotation arrangement 1, the following steps are effected.

In step a) overflow 101 of the mineral flotation circuit 10 is dewatered in the gravitational solid-liquid separator 21 to separate the sediment 212 from the supernatant 211 comprising water, silica-containing particle, soluble $SiO_2$, fine particles, microbes and residual flotation chemicals.

The residence time of overflow 101 in the gravitational solid-liquid separator in step a) is under 10 hours. The residence time may be 2 to 8 hours, for example 3.5 hours; 4 hours; 5.75 hours; or 6.5 hours. After step a), the solids content of the sediment 212 of the gravitational solid-liquid separator 21 may be over 80%, by weight.

In step b) the supernatant 211 is subjected to cleaning flotation in the cleaning flotation unit 23 for collecting at least silica-containing particles, for separating at least silica-containing particles from the supernatant into cleaning flotation overflow 232, and for forming purified process water 231 as cleaning flotation underfloor. In the cleaning flotation, at least 90% of the flotation gas bubbles fall into a size range of 0.2 to 250 μm. The cleaning flotation may be dissolved gas flotation (DAF), i.e. the cleaning flotation unit 23 may be a DAF unit.

Prior to step b), the temperature and the pH of the supernatant 211 may be adjusted to optimize the cleaning flotation in the cleaning flotation unit 23, or the preceding process steps may cause the temperature and/or the pH of the supernatant to display certain values. The temperature of the supernatant 211 may be, or may be adjusted to, 2-70° C. The pH of the supernatant 211 may be, or may be adjusted to, 5-14. In case the aforementioned properties of the supernatant 211 need to be separately adjusted, this may be done in the separator overflow tank 21b, and/or in the mixing unit 22.

In step c) cleaning flotation overflow 232 is removed as tailings, and in step d) purified process water 231 is recirculated into the mineral flotation circuit 10. Prior to recirculating the purified process water 231 into the mineral flotation circuit 10, it may be subjected to a filtration step for removing chemicals promoting microbiological growth, or for removing other undesired or detrimental chemical compounds. In the filtration step, a filtering unit 24 comprising a ceramic filter may be used.

In an additional method step, the supernatant 211 may be led into a separator overflow tank 21b after step a). Additionally or alternatively, the supernatant 211 may be chemically conditioned in a mixing unit 22 prior to step b). The supernatant may be led into the mixing unit 22 directly from the gravitational solid-liquid separator 21 or from the separator overflow tank 21b, if such is used. In the mixing unit 22, the supernatant may be chemically conditioned by adding a coagulant to assist in collecting the $SiO_2$ in the supernatant by coagulating them, present either in the form silica-containing particles or as soluble $SiO_2$. The coagulant may be chosen from a group comprising: inorganic coagulants, aluminium salts, iron salts, organic coagulants.

One possible inorganic coagulant is polyaluminium chloride (PAC). An inorganic coagulant may be added into the supernatant 211 in the mixing unit 22 in an amount of 20 to 2000 ppm, for example in an amount of 50 ppm, 75 ppm, 150 ppm, 225 ppm, 350 ppm, or 400 ppm. In an embodiment, 100 ppm PAC is added. An organic coagulant may be added into the supernatant 211 in an amount of 5 to 200 ppm.

Alternatively or additionally, the supernatant 211 may be conditioned in the mixing unit 22 by adding a flocculant to further assist in collecting the SiO2 in the supernatant 211 by flocculating them. For example, natural flocculant such as starch or modified starch, or polysaccharides may be used. For example, synthetic flocculants may be used. The synthetic flocculants may display different charges. Examples of synthetic flocculants are: high molecular weight (over 500000) flocculants such as polyacrylamides (negatively or positively charged, or neutral), or Mannich products (positively charged); and low molecular weight (under 500000) flocculants such as polyamines (positively charged), polyepiamine (positively charged), polyDADMAC (positively charged), poly(ethylene)imines (positively charged), or polyethylene oxide (neutral).

A flocculant may be added in an amount of 1 to 100 ppm, for example in an amount of 1.25 ppm, 1.75 ppm, 2.25 ppm, 7.5 pp, or 12.25 ppm. In an embodiment, 2 ppm of a flocculant is added.

By the method according to the invention, at least 90% of the $SiO_2$ present in overflow 101 of the mineral flotation circuit 10 may be removed in step b). Further, at least 70% of the soluble $SiO_2$ present in overflow 101 of the mineral flotation circuit 10 may be removed in step b). At the same time, hardness of purified process water 231 is unaffected by the process water treatment arrangement 20 and/or the process for treating process water, i.e. hardness of water of overflow 101 from the mineral flotation circuit 10 is the substantially the same as hardness of water of the purified process water 231 recirculated into the mineral flotation circuit 10.

The embodiments described hereinbefore may be used in any combination with each other. Several of the embodiments may be combined together to form a further embodiment. A flotation cell to which the disclosure is related, may comprise at least one of the embodiments described hereinbefore. It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for treating process water of a flotation arrangement comprising a mineral flotation circuit arranged to treat ore particles comprising Fe suspended in a slurry by reverse flotation for the separation of the slurry into an underflow and an overflow, and a process water treatment arrangement for treating the overflow of the mineral flotation circuit, the method comprising the steps of:
   a) dewatering the overflow of the mineral flotation circuit in a gravitational solid-liquid separator to separate a sediment from a supernatant that comprises water, silica-containing particles and soluble $SiO_2$, fine particles, microbes, and residual flotation chemicals, wherein after step a), the supernatant is led directly into a separator overflow tank,
   b) subjecting the supernatant received from the separator overflow tank to cleaning flotation, in which at least 90% of the flotation gas bubbles have a size from 0.2 to 250 µm, in a cleaning flotation unit for collecting at least silica-containing particles, for separating at least silica-containing particles from the supernatant into a cleaning flotation overflow, and for forming purified process water as a cleaning flotation underflow,
   c) removing the cleaning flotation overflow as tailings, and
   d) recirculating the purified process water into the mineral flotation circuit.

2. The method according to claim 1, wherein the cleaning flotation unit is a dissolved gas flotation unit.

3. The method according to claim 1, wherein prior to step b), the temperature of the supernatant is 2 to 70° C.

4. The method according to claim 1, wherein prior to step b), the pH of the supernatant is 5 to 14.

5. The method according to claim 1, wherein in step a), the residence time of the overflow in the gravitational solid-liquid separator is under 10 hours.

6. The method according to claim 5, wherein a residence time of the overflow in the gravitational solid-liquid separator is in the range of 2-8 hours.

7. The method according to claim 1, wherein the solids content of the sediment of the gravitational solid-liquid separator is at least 80 wt %.

8. The method according to claim 1, wherein prior to step b), the supernatant is chemically conditioned in a mixing unit by adding a coagulant and/or a flocculant to flocculate silica-containing particles in the supernatant.

9. The method according to claim 8, wherein the coagulant is chosen from a group consisting of inorganic collector, aluminium salts, iron salts, and organic coagulants.

10. The method according to claim 8, wherein a coagulant is added into the supernatant in an amount of 20 to 2000 ppm.

11. The method according to claim 8, wherein the flocculant is chosen from a group consisting of natural polymers, and synthetic flocculants.

12. The method according to claim 8, wherein a flocculant is added into the supernatant in an amount of 2 to 100 ppm.

13. The method according to claim 1, wherein in step b), at least 90% of the SiO2 of overflow from the flotation circuit is removed.

14. The method according to claim 1, wherein in step b), at least 70% of soluble SiO2 of overflow from the flotation circuit is removed.

15. The method according to claim 1, wherein prior to step d), the purified process water is subjected to filtration for removing chemicals promoting microbiological growth.

16. The method according to claim 15, wherein in filtration, a filtering unit comprising a ceramic filter is used.

17. The method according to claim 1, wherein hardness of the purified process water is unaffected by the process water treatment arrangement.

* * * * *